J. C. TURVENE.
VENTILATOR.
APPLICATION FILED OCT. 30, 1919.

1,337,296.

Patented Apr. 20, 1920.
2 SHEETS—SHEET 1.

John C. Turvene, Inventor

Attorneys

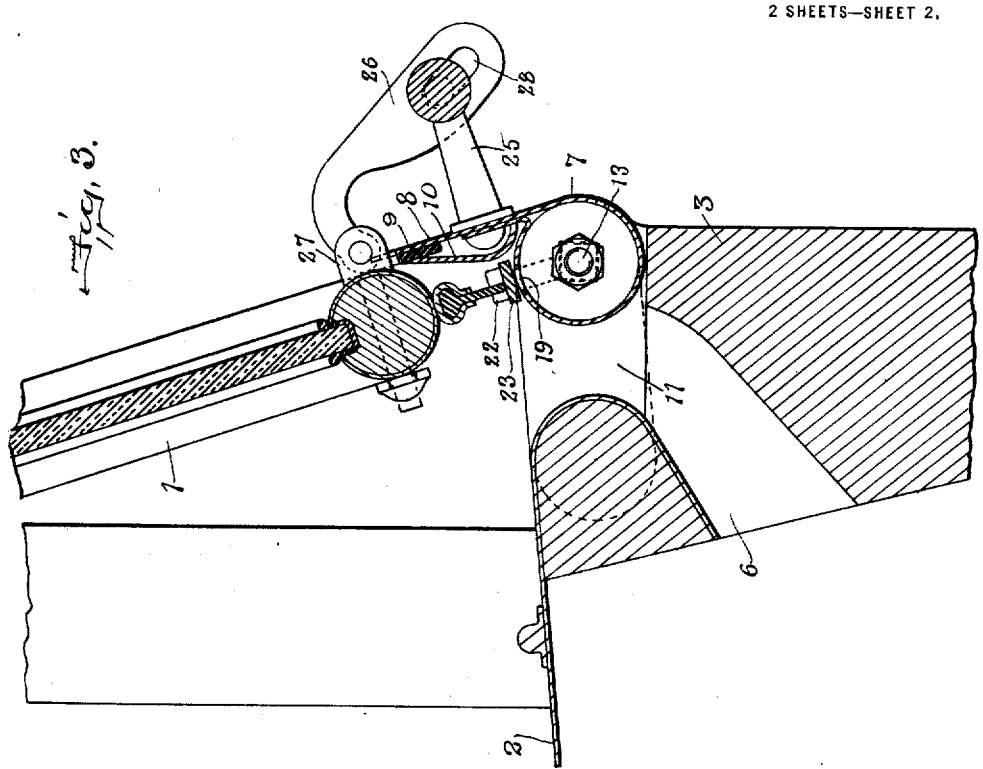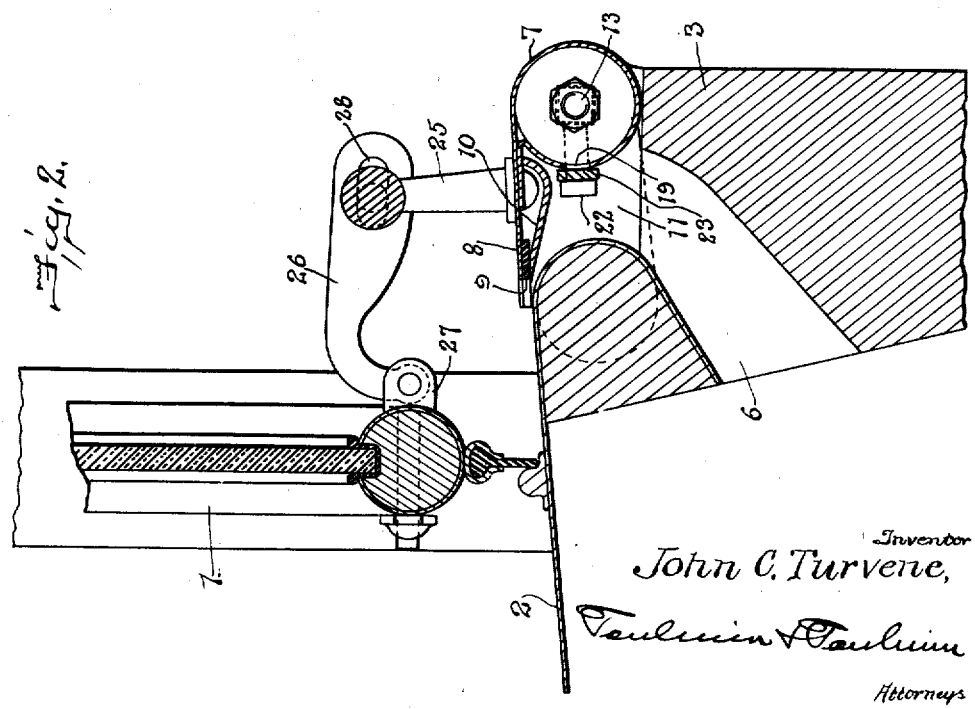

UNITED STATES PATENT OFFICE.

JOHN C. TURVENE, OF DAYTON, OHIO.

VENTILATOR.

1,337,296.   Specification of Letters Patent.   Patented Apr. 20, 1920.

Application filed October 30, 1919. Serial No. 334,412.

*To all whom it may concern:*

Be it known that I, JOHN C. TURVENE, a citizen of the United States, residing at Dayton, in the county of Montgomery and State of Ohio, have invented certain new and useful Improvements in Ventilators, of which the following is a specification, reference being had therein to the accompanying drawing.

This invention relates to improved ventilators for the front ends of automobile bodies and has for its particular object to provide a ventilator attachment or deflector adapted to be used in combination with adjustable wind shields of the usual construction and which serves to deflect the currents of air passing under the wind shield, when the same is adjusted to admit air therethrough, downwardly to contact with the floor of the machine.

By this arrangement the objection, common to the present prevailing practice of wind shield ventilation, of currents of air striking the knees of the driver and front seat passengers of the machine, with the resulting advantage of deflecting the air downwardly to the floor of the machine and to the feet of the occupants of the front seat which at times are rendered uncomfortable by the heat from the motor.

My invention is an improvement of auxiliary ventilators of this character, its novelty consisting in simplicity and cheapness of construction and arrangement and its effective adaptability to the prevailing form of cowl and instrument board construction of different makes of automobiles.

In the accompanying drawings:

Fig. 2 is a detail longitudinal section of such portions of an automobile body which coöperate in the use of the present invention, showing the wind shield and auxiliary ventilator in closed position;

Fig. 3 is a view corresponding to Fig. 1 but showing the windshield and auxiliary ventilator in open position;

Figure 1:
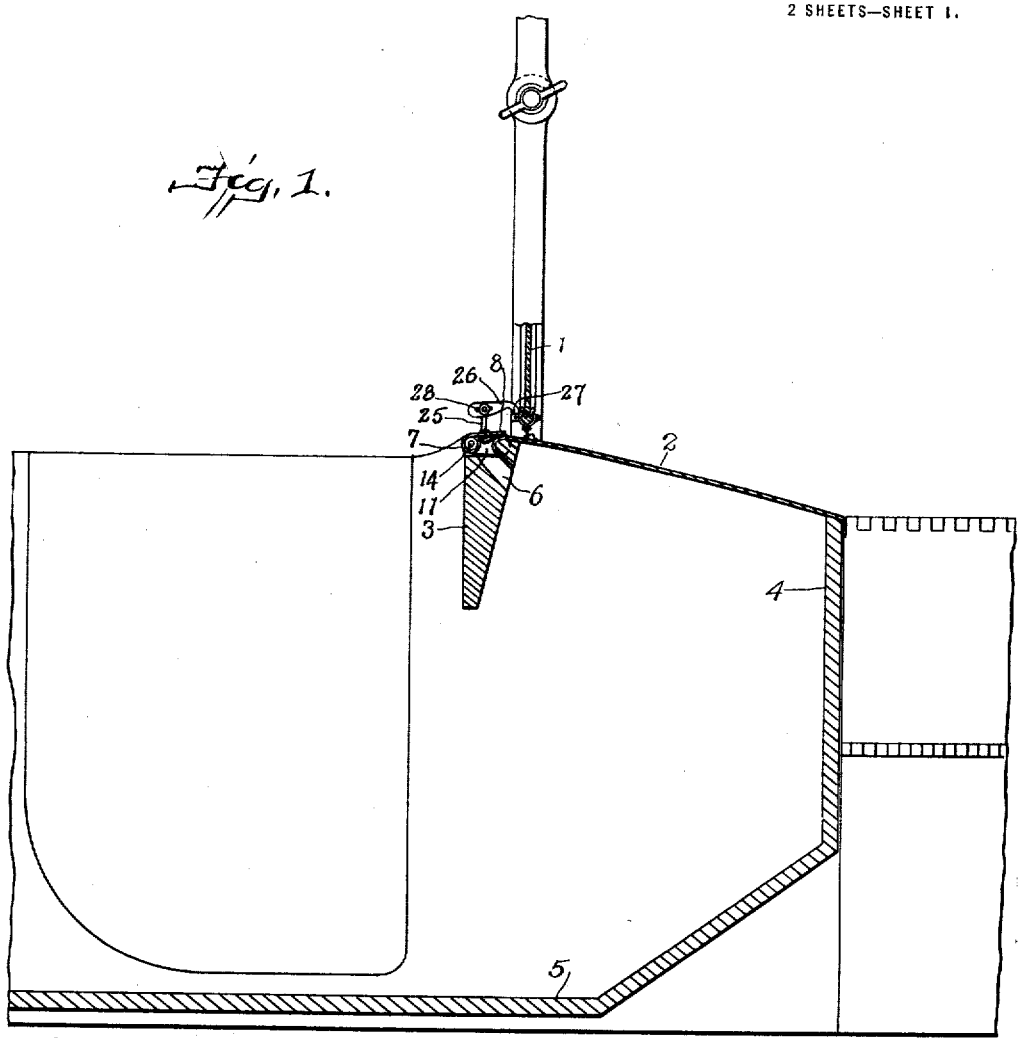
Figure 1 is a longitudinal, vertical sectional view through a portion of the front end of an automobile body, showing my improved ventilator applied to the windshield thereof.
Figure 4:
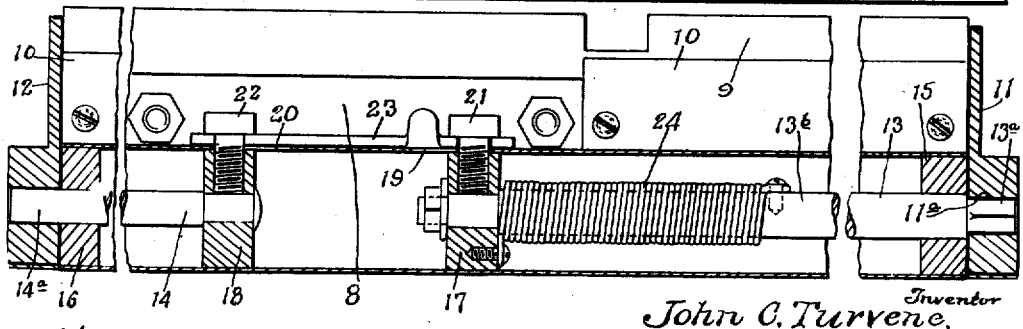
Fig. 4 is a longitudinal sectional view of the auxiliary ventilator illustrating the details of construction.

As here shown the coöperating parts of the automobile consist of the wind shield 1, the cowl 2, instrument board 3, dash 4 and the floor 5 of the machine, all of which may be of standard or other suitable construction except that the instrument board is apertured to provide air ducts 6 therethrough, the air ducts being inclined downwardly to cause the air currents passing therethrough to be deflected against the dash downwardly to the floor of the machine.

It will be understood, of course, that the form of construction and arrangement of parts here shown are for illustrative purposes only and that suitable modification can readily be made both as to details of construction and arrangement without departing from the essential principles of my invention.

The auxiliary ventilator consists of a longitudinal, tubular casing 7 having a deflector plate 8 secured thereto, the tube and plate preferably being made integrally. These parts may be supported relative to the air passages 6 in any suitable manner to accomplish the purposes of their operation. As here shown they are mounted adjacent the upper edge of the instrument board and extend transversely of the machine substantially the full length or width of the wind shield with the deflector plate in position to contact with the rear end of the cowl when the wind shield is closed and to contact with the lower edge of the wind shield when the same is open. To make the contact of the deflector plate with the wind shield more effective to prevent currents of air passing therebetween, the contact edge of the plate may be provided with a strip 9 of compressible or resilient material, such as felt or rubber, and to stiffen the plate to maintain its shape, etc., a reinforcing strip 10 is preferably secured to the under side thereof which serves the further purpose of retaining the strip 9 in position.

The casing 7 and deflector plate 8 and their supplemental parts may be mounted in any suitable bearings formed in the side walls of the body of the machine or in suitable edge extensions of the cowl, which as here shown consist of bearing plates 11 and 12 which may be secured to the supporting wood or metal in any suitable manner, as by screws or rivets. Coöperating with these plates are bearing shafts 13 and 14 supported in bearings 15—17 and 16—18, respectively, in the casing 7, the bearings or inner supporting blocks 17—18 together with the bearing shafts 13—14 being adjustable longitudinally of the casing 7 to permit of retracting the shafts to cause their projecting bearing ends 13ª and 14ª to come substantially flush with the outer faces of the bearing plates 15—16 and thus to permit of readily assembling and adjusting the parts in the side bearings 11—12.

To permit of moving the shafts 13—14 longitudinally, the casing 7 is provided with two opposite longitudinal slots 19—20, and the supporting blocks 17—18 are provided with suitable screws 21—22 projecting through the respective slots 19—20, whereby the shafts may be shifted inwardly to permit of assembling the fixture in the machine, and outwardly to project the bearing ends 13ª—14ª into the bearing plate 11—12, a latch plate 23, secured to the supporting block 18 by means of the screw 22 and coöperating at its opposite end with the screw 21, serving to lock the shafts 13—14 in their outwardly projected position.

The shaft 13 has secured thereon a coiled spring 24 having one of its ends secured to the shaft and its opposite end secured to the bearing block 17; the outer end 13ª of the shaft being squared, as here shown, to fit the square aperture 11ª of the bearing plate 11, the inner end 13ᵇ of the shaft being round and free to rotate in the bearing block 17, the set screw 21 serving to hold the shaft in adjusted position when the same is turned to adjust the tension of the spring which is done before the fixture is mounted in the side bearings 11—12. After the fixture is mounted in the bearings the square aperture 11ª in the bearing 11 will act to hold the shaft 13 against rotary movement and the spring 24, having its one end secured to the shaft and its opposite end to the bearing block 17 will act to exert the pressure developed by the tension of the spring on the deflector plate 8 in a downwardly direction to normally close the air passages 6 as shown in Fig. 1 of the drawings.

The deflector plate is connected to the wind shield by means of two opposite arms 25 secured in the plate in any suitable manner and joined together at their outer ends by a cross bar to form a suitable hand hold by means of which the plate may be raised or lowered; and two opposite links 26 which connect the hand hold to the wind shield by means of an eye bolt 27 secured in the lower rail of the wind shield sash, the connection of the links 26 to the opposite ends of the hand hold being made by means of slots 28 which serve to provide the deflector plate with limited lost motion relative to the wind shield, thus to better adapt the same to the shield in the open and closed positions thereof.

From the foregoing detailed description the construction and operation of my improved ventilator will be readily understood. It will be seen that with the opening of the wind shield inwardly by drawing on the hand hold secured to the deflector plate 8 that the shield and the air passages 6 will be simultaneously opened and that the plate 7 will act to close the space between the lower edge of the shield and the tube 7 and thus to deflect the air downwardly through the air passages 6.

The friction normally exerted on the pivoted bearings upon which wind shields are supported by wing nuts usually employed to secure the wind shields in closed or adjusted open positions will be sufficient also to overcome the pressure exerted against the shield by the plate 8. Thus the wind shield may be adjusted in the usual manner at variable angles relative to the cowl 2 and the edge of the deflector plate will be held in close contact relation therewith by the action of the spring 24. It will be observed that the edge of the plate 8 projects a considerable distance over the face of the lower sash rail of the wind shield and therefore that the plate will have contact relation with the sash rail at different angles of adjustment.

Having thus fully described my invention, what I claim as new and desire to secure by Letters Patent, is:—

1. In ventilators for automobiles, the combination, with the wind shield of an automobile, of a cowl adjacent said wind shield, and an instrument board positioned relative to the cowl and having an air passage therethrough, said passage extending downwardly toward the floor of the machine, and a deflector plate coöperating with the wind shield and acting when the same is in lowered position to close said passage, and when said shield is in raised position to open said passage and to direct currents of air therethrough.

2. In ventilators for automobiles, the combination, with the wind shield of an automobile, of a cowl adjacent said wind shield, and an instrument board positioned relative to the cowl and having an air passage therethrough, said passage extending downwardly toward the floor of the machine, and a deflector plate normally closing said air passage, having means connecting it to the wind shield and adapted to be actuated with the adjustment of the wind shield to open said passage to admit currents of air therethrough.

3. In ventilators for automobiles, the combination, with the wind shield of an automobile, of a cowl adjacent said wind shield, and an instrument board positioned relative to the cowl and having an air passage therethrough, said passage extending downwardly toward the floor of the machine, and a deflector normally closing said air passage having means connecting it to the wind shield and adjustable with the wind shield to various angular positions whereby to open said passage to a variable extent to direct currents of air therethrough.

4. In ventilators for automobiles, the combination, with the wind shield of an automobile, of a cowl adjacent said wind shield, and an instrument board positioned relative to the cowl and having an air passage therethrough, said passage extending downwardly toward the floor of the machine, and a deflector normally closing said air passage and coöperating with the wind shield when the same is adjusted to raised position to prevent the passage of air under said shield and to deflect the air through said passage.

5. In ventilators for automobiles, the combination, with the wind shield of an automobile, of a cowl adjacent said wind shield, and an instrument board positioned relative to the cowl and having an air passage therethrough, said passage extending downwardly toward the floor of the machine, and a deflector plate normally closing said air passage and coöperating with the wind shield in variable adjusted positions to prevent passage of air under said shield and to deflect currents of air through said passage.

6. In ventilators for automobiles, the combination, with the wind shield of an automobile, of a cowl adjacent said wind shield and an instrument board positioned relative to the cowl and having an air passage therethrough, said passage extending downwardly toward the floor of the machine, and a deflector rotatively mounted relative to said cowl and instrument board, normally closing said air passage and adjustable with the wind shield to variable positions to open said passage and to deflect currents of air therethrough.

7. In ventilators for automobiles, the combination, with the wind shield of an automobile, of a cowl adjacent said wind shield and an instrument board positioned relative to the cowl and having an air passage therethrough, said passage extending downwardly toward the floor of the machine, and a deflector pivotally mounted relative to said cowl and instrument board and connected to and adjustable with the wind shield to open and close said passage.

8. In ventilators for automobiles, the combination, with the wind shield of an automobile, of a cowl adjacent said wind shield and an instrument board positioned relative to the cowl and having an air passage therethrough, said passage extending downwardly toward the floor of the machine, and a spring actuated deflector rotatively mounted relative to said cowl and instrument board and adjustable with the wind shield to open and close said passage.

9. In ventilators for automobiles, the combination, with the wind shield of an automobile, of a cowl adjacent said wind shield and an instrument board positioned relative to the cowl and having an air passage therethrough, said passage extending downwardly toward the floor of the machine, and a deflector plate rotatively mounted relative to said cowl and instrument board and spring actuated to contact with the wind shield and connected to and adjustable with the wind shield to open and close said passage.

10. In ventilators for automobiles, the combination, with the wind shield of an automobile, of a cowl adjacent said wind shield and an instrument board positioned relative to the cowl and having an air passage therethrough, said passage extending downwardly toward the floor of the machine, and a deflector consisting of a tube and cover plate rotatively mounted to open and close said passage; end bearings and longitudinally adjustable shafts coöperating with said tube and bearings whereby the deflector may be adjusted relative to said passage.

11. In ventilators for automobiles, the combination, with the wind shield of an automobile, of a cowl adjacent with wind shield and an instrument board positioned relative to the cowl and having an air passage therethrough, said passage extending downwardly toward the floor of the machine, and a deflector consisting of a tube and cover plate coöperating with said passage, end bearings and longitudinally adjustable shafts coöperating with said bearings whereby to mount the deflector to open and close said passage, and a spring coöperating with one of said shafts and the tube and serving normally to actuate the deflector to close said passage.

12. An auxiliary ventilator for an automobile consisting of an integral slotted tube and a cover plate extending tangentially therefrom, longitudinally operable shafts coöperating with the opposite ends of said tube and having connections projecting through the slots in said tube, whereby the ends of said shafts may be projected and retracted relative to the ends of said tube.

13. An auxiliary ventilator for an automobile consisting of an integral slotted tube and a cover plate extending tangentially therefrom, longitudinally operable shafts coöperating with the opposite ends of said tube and having connections projecting through the slots in said tubes, whereby the ends of said shafts may be projected and retracted relative to said tube and means coöperating with said connections to lock the shafts in their projected positions.

14. An auxiliary ventilator for an automobile consisting of a tube and a cover plate; longitudinally extending shafts having bearing supports in said tube and adapted to support said ventilator rotatively in said machine, and a spring coöperating with one of said shafts and the tube to move the cover plate rotatively.

15. An auxiliary ventilator for an automobile consisting of a tube and a cover plate; longitudinally extending shafts having bearing supports in said tube and adapted to support said ventilator rotatively in said machine, one of said shafts being adapted to rotate with said tube and the other shaft to be held in fixed relation relative to the tube, and a spring coöperating with the fixed shaft to impart rotative movement to the tube and cover plate.

16. An auxiliary ventilator for an automobile consisting of a tube and a cover plate; longitudinally extending shafts having bearing supports in said tube and adapted to support said ventilator rotatively in said machine, one of said shafts being adapted to rotate with the tube and the other shaft to have movement relative to the tube, a spring coöperating with the latter shaft to exert tension on said plate, and means to rotate the shaft to wind said spring and to secure the spring in its wound relation relative to the shaft and tube.

In testimony whereof I affix my signature.

JOHN C. TURVENE.